(12) United States Patent
Xu et al.

(10) Patent No.: US 7,990,720 B2
(45) Date of Patent: Aug. 2, 2011

(54) ELECTRONIC SYSTEM WITH HEAT DISSIPATION STRUCTURE

(75) Inventors: Shou-Biao Xu, Shenzhen (CN); Shi-Wen Zhou, Shenzhen (CN); Chun-Chi Chen, Taipei Hsien (TW)

(73) Assignees: Fu Zhun Precision Industry (Shen Zhen) Co., Ltd., Shenzhen, Guangdong Province (CN); Foxconn Technology Co., Ltd., Tu-Cheng, New Taipei (TW)

( * ) Notice: Subject to any disclaimer, the term of this patent is extended or adjusted under 35 U.S.C. 154(b) by 0 days.

(21) Appl. No.: 12/614,452

(22) Filed: Nov. 9, 2009

(65) Prior Publication Data

US 2010/0309626 A1  Dec. 9, 2010

(30) Foreign Application Priority Data

Jun. 4, 2009  (CN) .......................... 2009 1 0302933

(51) Int. Cl.
*H05K 7/20* (2006.01)

(52) U.S. Cl. ........ 361/719; 361/690; 361/704; 361/707; 165/80.3

(58) Field of Classification Search ........................ None
See application file for complete search history.

(56) References Cited

U.S. PATENT DOCUMENTS

| | | | |
|---|---|---|---|
| 5,946,192 A * | 8/1999 | Ishigami et al. | 361/704 |
| 6,055,158 A * | 4/2000 | Pavlovic | 361/704 |
| 6,239,972 B1 * | 5/2001 | Tehan et al. | 361/704 |
| 6,434,000 B1 * | 8/2002 | Pandolfi | 361/679.33 |
| 6,680,849 B2 * | 1/2004 | Atkinson et al. | 361/719 |
| 6,749,448 B2 * | 6/2004 | Bright et al. | 439/160 |
| 6,836,409 B1 * | 12/2004 | Duxbury et al. | 361/704 |
| 6,992,895 B2 * | 1/2006 | Lindberg | 361/719 |
| 7,050,305 B2 * | 5/2006 | Thorum | 361/719 |
| 7,177,154 B2 * | 2/2007 | Lee | 361/704 |
| 7,254,034 B2 * | 8/2007 | Bolle et al. | 361/719 |
| 7,391,610 B2 * | 6/2008 | Schultz et al. | 361/688 |
| 7,554,805 B2 * | 6/2009 | Liu et al. | 361/695 |

* cited by examiner

*Primary Examiner* — Boris L Chervinsky
(74) *Attorney, Agent, or Firm* — Frank R. Niranjan

(57) ABSTRACT

An electronic system such as a computer system includes a casing defining an opening at a side thereof, a motherboard arranged in the casing, a hard disk located at a side of the motherboard and a heat dissipation structure covering the opening of the casing. The motherboard includes a printed circuit board facing toward the opening of the casing, first electronic components and second electronic components mounted on the printed circuit board and facing toward the opening. The heat dissipation structure includes a base engaging with the casing and fins extending from the base and outside of the casing. The base includes a first engaging portion contacting the first and second electronic components and a second engaging portion contacting the hard disk. The first engaging portion and the second engaging portion are in different levels from each other.

16 Claims, 4 Drawing Sheets

ELECTRONIC SYSTEM WITH HEAT DISSIPATION STRUCTURE

BACKGROUND

1. Technical Field

The present disclosure relates to electronic systems and, particularly, to an electronic system with a heat dissipation structure for dissipating heat from electronic components of the electronic system.

2. Description of Related Art

It is well known that many electronic systems comprising many electronic components generate plenty of heat, and that the heat must be timely removed from the electronic components to ensure they can work normally. For example, a personal computer system comprises a casing and a plurality of electronic components such as a CPU (central processing unit), a north bridge chip and so on arranged in the casing. Generally, such components need heat sinks or fans mounted thereon to remove the heat generated by them.

With the trend toward miniaturization of computer systems, the electronic components in the casing of a modern computer system may be densely crammed together. The spaces available inside the casing for mounting of heat sinks and fans may be very limited. As a result, some modern heat sinks and fans are small, and correspondingly have small heat dissipation capability. Additionally, some electronic components may have no adjacent space available for mounting of heat sinks or fans thereat. In such cases, the heat generated by the electronic components may not be removed rapidly enough. Furthermore, when heat is removed from electronic components by heat sinks or fans, some of the heat may remain in the casing an unduly long time. Overall, many small computer systems may not have effective heat removal means for their electronic components. Therefore, a new heat dissipation structure is needed for the electronic system.

What is needed, therefore, is an electronic system with heat dissipation means capable of effectively dissipating heat generated by electronic components of the electronic system.

BRIEF DESCRIPTION OF THE DRAWINGS

Many aspects of the present electronic system can be better understood with reference to the following drawings. The components in the drawings are not necessarily drawn to scale, the emphasis instead being placed upon clearly illustrating the principles of the present electronic system. Moreover, in the drawings, like reference numerals designate corresponding parts throughout the several views.

DETAILED DESCRIPTION

Figure 1:
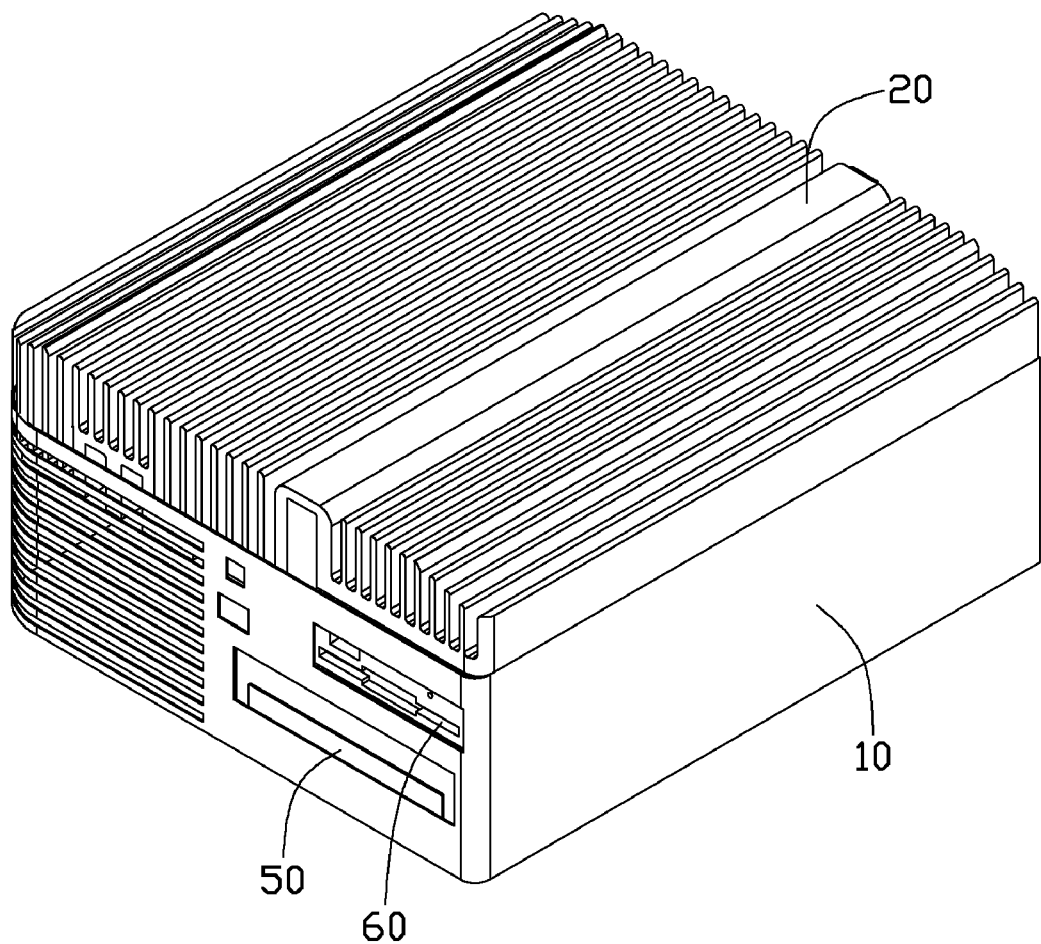
FIG. 1 is an assembled, isometric view of an electronic system in accordance with an embodiment of the disclosure.
Figure 2:
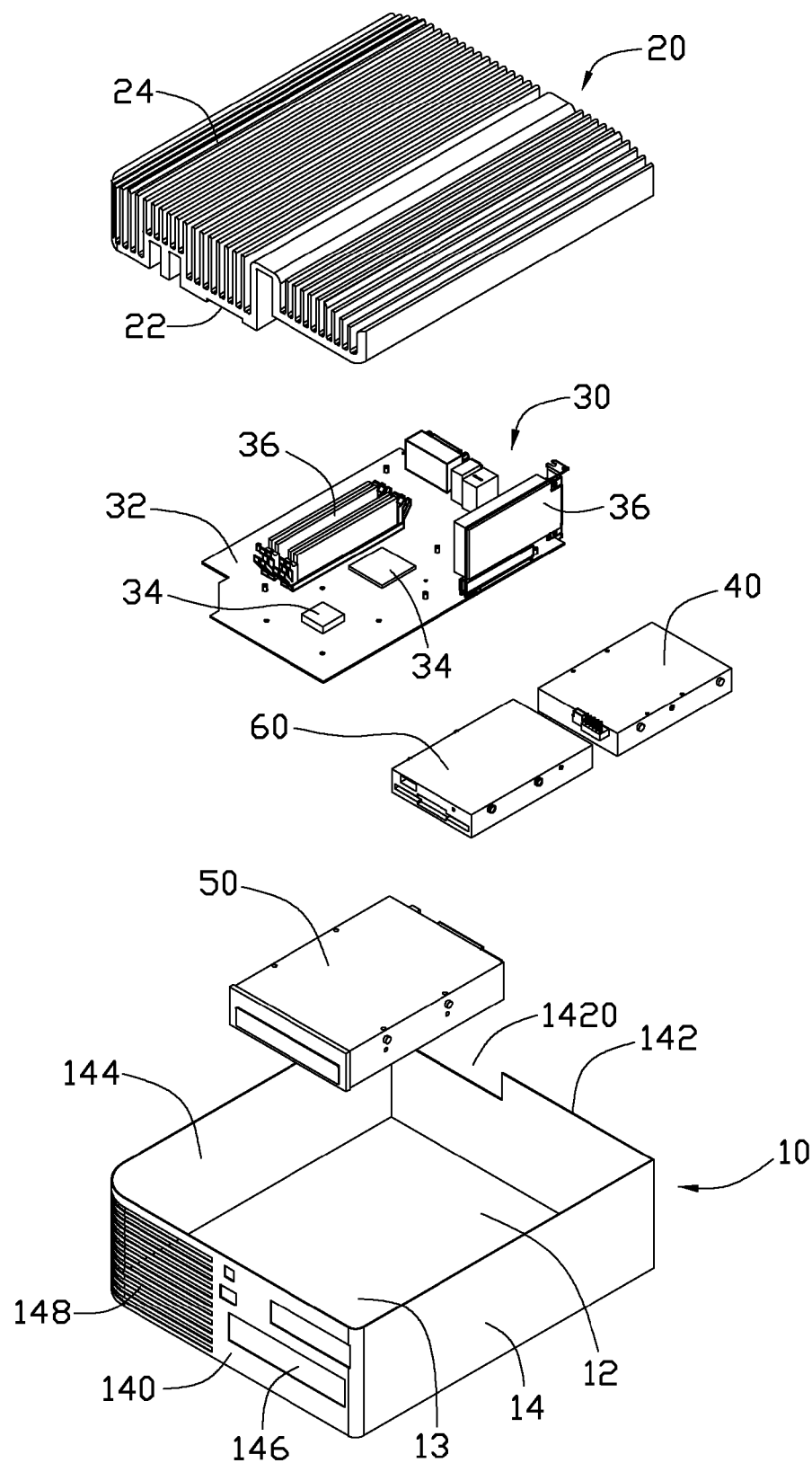
FIG. 2 is an exploded view of the electronic system of FIG. 1.

Referring to FIG. 1 and FIG. 2, an embodiment of an electronic system is shown. The electronic system comprises a casing 10, a plurality of electronic devices arranged in the casing 10, and a heat dissipation structure 20 covering the casing 10 and sealing the electronic devices in the casing 10 to dissipate heat from the electronic devices. In this embodiment, in order to illustrate aspects of the invention clearly, a computer system is taken as an example. The computer system comprises a motherboard 30 having a plurality of electronic components, a hard disk 40, a CD driver 50, and a floppy driver 60, all received in the casing 10. The heat dissipation structure 20 is in contact with the electronic components and seals them in the casing 10.

The casing 10 is a rectangular hollow body, which is integrally made from metal with good heat conductivity such as aluminum, steel, or alloy, or from composite material such as carbon fiber. The casing 10 comprises a rectangular main plate 13 and an annular frame 14 extending from the main plate 13. The frame 14 is in a shape of a square prism, and comprises a face plate 140, a back plate 142 and two side plates 144 connecting the face plate 140 and the back plate 142. The face plate 140 has a side portion defining two spaced slots corresponding to the CD driver 50 and the floppy driver 60. The slots are for installing or removing the CD driver 50 and the floppy driver 60 into or from the casing 10. The face plate 140 has an opposite side portion defining a plurality of parallel passages 148, which are for airflow into and out of the casing 10. The back plate 142 defines a cutout 1420 at an upper portion thereof. The cutout 1420 corresponds to I/O (input/output) ports of the motherboard 30, so that the motherboard 30 can be connected with external equipment. The casing 10 defines an opening 12 surrounded by upper portions of the face plate 140, the side plates 144 and the back plate 142, for receiving the heat dissipation structure 20. The cutout 1420 is in communication with the opening 12 adjacent to a corner of the casing 10.

Figure 3:
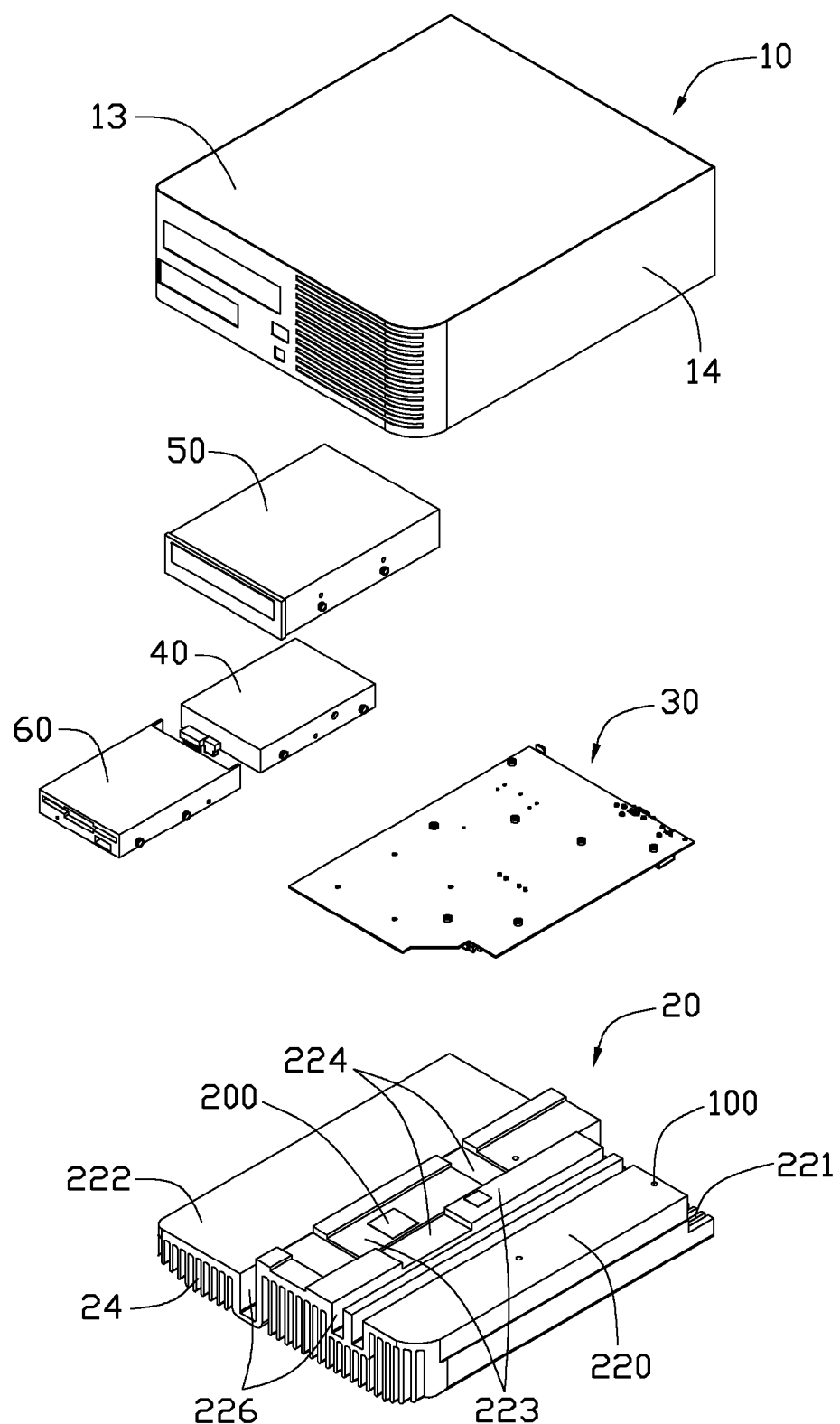
FIG. 3 is an inverted view of the electronic system shown in FIG. 1.

Referring also to FIG. 3, the motherboard 30 comprises a substantially rectangular printed circuit board 32, which has a cutout (not labeled) defined in a corner thereof. A plurality of first electronic components 34 such as a CPU, a north bridge, and other chips are horizontally mounted on the printed circuit board 32. The first electronic components 34 each have a large horizontal main heat-generating face parallel to the printed circuit board 32. A plurality of second electronic components 36 such as a memory card, a graphic card, and other cards are perpendicularly mounted on the printed circuit board 32. The second electronic components 36 each have a large vertical main heat-generating face perpendicular to the printed circuit board 32. A plurality of other electronic components (not shown), such as capacitors, resistances and/or metal-oxide-semiconductor field-effect transistors (MOSFETs), are arranged around the first and second electronic components 34, 36 on the printed circuit board 32.

Figure 4:
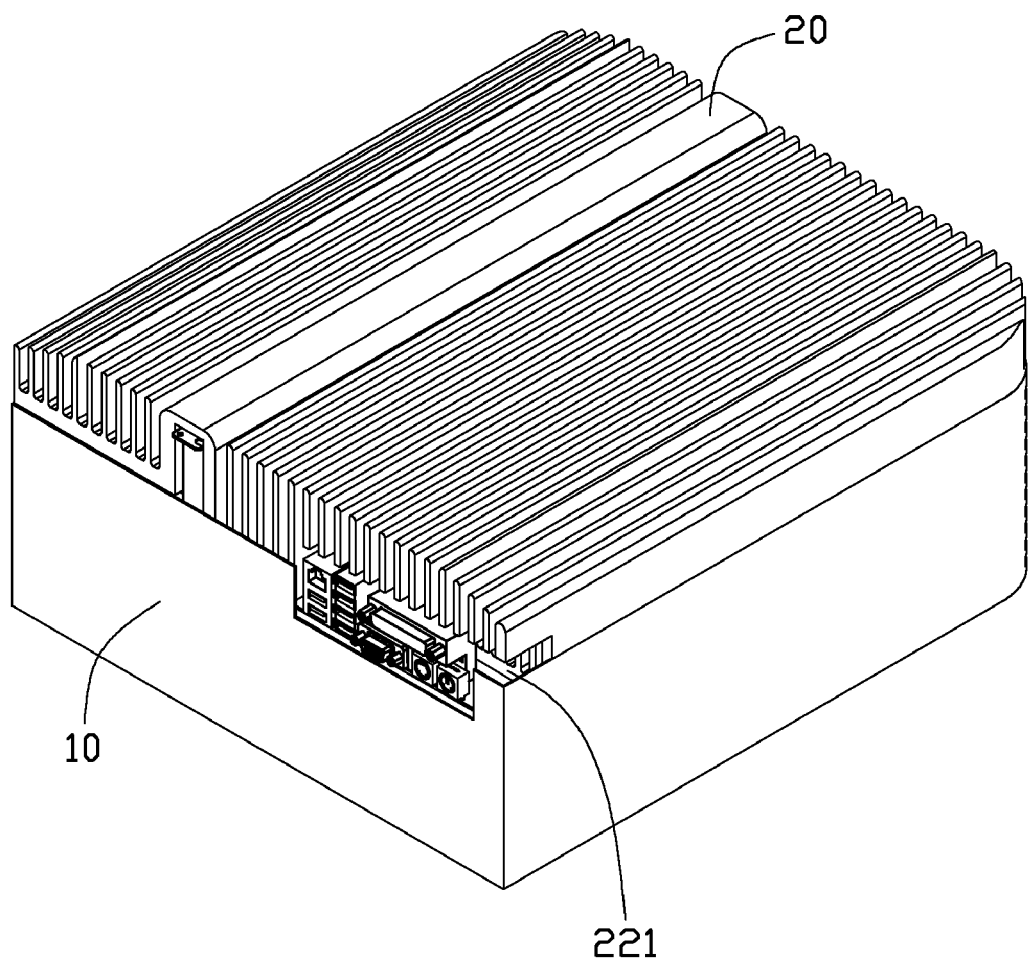
FIG. 4 is similar to FIG. 1, but viewing the electronic system from a different aspect.

Referring also to FIG. 4, the heat dissipation structure 20 is an extrusion heat sink, which is made from metal with good heat dissipation capability such as aluminum, copper or alloy thereof. The heat dissipation structure 20 comprises a base 22, and a plurality of fins 24 extending from the base 22.

The base 22 has a peripheral size identical to that of the frame 14 of the casing 10 so that the base 22 can properly cover the opening 12 of the casing 10. The base 22 has a bottom. The bottom forms a first engaging portion 220 for contacting the motherboard 30, and a second engaging portion 222 for contacting the hard disk 40 and the floppy driver 60. The first engaging portion 220 is in a first level, and the second engaging portion 222 is in a second level different from the first level. A plurality of steps 223 with different heights are formed at the first engaging portions 220, for contacting the first electronic components 34 with different thicknesses. At sides of the steps 223, a plurality of rectangular or square recesses 224 are defined in the first engaging portion 220 for receiving capacitors, resistances or MOSFETs of the motherboard 30. A plurality of elongated grooves 226 with different depths are defined in the first engaging portion 220, for receiving corresponding second electronic components 36 of the motherboard 30. The first engaging portion 220 has a notch 221 defined at one end thereof, corresponding to the cutout 1420 of the frame 14 of the casing 10. A plurality of screw holes 100 are defined in the bottom of the base 22, for screws (not shown) to engage therein and thereby lock the motherboard 30 with the heat dissipation structure 20.

The fins 24 are spaced from each other and parallel to each other. A plurality of air passages are defined between the fins 24. The fins 24 are divided into four sets, according to portions of the base 22 from where they extend. Distal ends of the fins 24 are substantially flush with each other, except that a few of the outmost fins 24 have gradually reducing heights from one such fin to the next. Thereby, the fins 24 cooperatively define two imaginary continuous curved surfaces smoothly formed at two opposite sides of an imaginary middle planar surface. With such configuration, the electronic system has a neat, smooth, safe and attractive contour when the heat dissipation structure 20 is assembled with the casing 10.

Referring to FIGS. 1-4, in assembly, the motherboard 30 is arranged in the casing 10, with the printed circuit board 32 and the electronic components 34, 36 facing the opening 12 of the casing 10. The CD driver 50 and the floppy driver 60 are arranged in the casing 10 corresponding to the two slots 146, respectively. The hard disk 40 is arranged at a side of the floppy driver 60 in the casing 10. The heat dissipation structure 20 is engaged with the frame 14 and covers the opening 12 of the casing 10, with the fins 24 being outside of the casing 10 and extending away from the casing 10. A lower portion of the first engaging portion 220 of the base 22 of the heat dissipation structure 20 protrudes into the casing 10. A bottom of the second engaging portion 222 of the base 22 directly contacts the frame 14, the floppy driver 60 and the hard disk 40.

In the casing 10, the first engaging portion 220 of the base 22 contacts the first and second electronic components 34, 36. In detail, the main heat-generating faces of the first electronic components 34 contact corresponding steps 223 of the first engaging portion 220. For example, the CPU contacts a lower one of the steps 223, and the north bridge contacts an upper one of the steps 223. The capacitors, resistances and/or MOSFETs are received in corresponding recesses 224. The capacitors, resistances and/or MOSFETs can directly contact the first engaging portion 220, or they can just be received in the recesses 224 and not be in contact with the first engaging portion 220. The second electronic components 36 such as the memory card and graphic card are received in corresponding grooves 226, with the main faces of the second electronic components 36 contacting the first engaging portion 220.

In this embodiment, a plurality of elastic thermal pads 200 are sandwiched between the first engaging portion 220 and the horizontal, vertical heat-generating faces of the first, second electronic components 34, 36. The elastic thermal pads 200 reduce heat resistance between the first engaging portion 220 and the first and second electronic components 34, 36, and reduce or even eliminate noise that would otherwise be generated if the first engaging portion 220 were in direct contact with the first and second electronic components 34, 36.

In use, the electronic components 34, 36, the hard disk 40, and the floppy driver 60 of the motherboard 30 work and generate heat. The heat generated by the electronic components 34, 36 is absorbed by the first engaging portion 220 of the base 22. The heat generated by the hard disk 40 and the floppy driver 60 is absorbed by the second engaging portion 222 of the base 22. The heat absorbed in the base 22 is directly transferred out of the casing 10 to the fins 24 to be dissipated to ambient air outside of the casing 10.

It is to be understood, however, that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the embodiments to the full extent indicated by the broad general meaning of the terms in which the appended claims are expressed.

The invention claimed is:

1. An electronic system comprising:
   a printed circuit board;
   a plurality of first electronic components and second electronic components mounted on the printed circuit board;
   a casing having the printed circuit board with the first and second electronic components mounted therein, the casing defining an opening at a side thereof, the first and second electronic components facing toward the opening;
   a heat dissipation structure covering the opening of the casing and comprising:
   a base comprising:
      a first engaging portion contacting the first and second electronic components in the casing, and
      a second engaging portion; and
   a plurality of fins extending from the base and located outside of the casing; and
   a first electronic device mounted in the casing and spaced from the printed circuit board, wherein the second engaging portion contacts the first electronic device, and the first engaging portion and the second engaging portion of the base of the heat dissipation structure are at different levels.

2. The electronic system of claim 1, wherein the first engaging portion of the base of the heat dissipation structure forms a plurality of steps contacting the first electronic components in the casing.

3. The electronic system of claim 2, wherein the steps of the first engaging portion of the base of the heat dissipation structure are at different heights from each other.

4. The electronic system of claim 2, wherein the first engaging portion of the base of the heat dissipation structure defines a plurality of grooves receiving at least portions of the second electronic components, the second electronic components contacting the first engaging portion of the base in the grooves.

5. The electronic system of claim 2, further comprising a plurality of third electronic components, wherein the first engaging portion of the base of the heat dissipation structure defines a plurality of recesses receiving at least portions of the third electronic components therein.

6. The electronic system of claim 1, further comprising a second electronic device, wherein the second engaging portion of the base further contacts the second electronic device.

7. The electronic system of claim 1, wherein the casing defines a cutout adjacent to a corner thereof and in communication with the opening.

8. The electronic system of claim 7, wherein the heat dissipation structure defines a notch adjacent to a corner thereof and corresponding to the cutout of the casing.

9. A computer system comprising:
   a casing defining an opening at a side thereof;
   a motherboard arranged in the casing, the motherboard comprising a printed circuit board facing toward the opening of the casing, and a plurality of first electronic components and a plurality of second electronic components mounted on the printed circuit board and facing toward the opening;

a hard disk located at a side of the motherboard; and a heat dissipation structure covering the opening of the casing, the heat dissipation structure comprising a base engaging with the casing and a plurality of fins extending from the base, the base comprising a first engaging portion contacting the first and second electronic components and a second engaging portion contacting the hard disk, the first engaging portion and the second engaging portion being at different levels from each other, each of the first electronic components having a main heat-generating face parallel to the printed circuit board and contacting the first engaging portion of the base of the heat dissipation structure, each of the second electronic components having a main heat-generating face perpendicular to the printed circuit board and contacting the first engaging portion of the base of the heat dissipation structure.

10. The computer system of claim 9, wherein the fins extend away from the casing.

11. The computer system of claim 9, wherein the first engaging portion of the base of the heat dissipation structure forms a plurality of steps corresponding to and contacting the main heat-generating faces of the first electronic components of the printed circuit board.

12. The computer system of claim 11, wherein the steps of the first engaging portion of the base are at different heights from each other.

13. The computer system of claim 11, wherein the first engaging portion of the base of the heat dissipation structure defines a plurality of grooves corresponding to and receiving the second electronic components therein, the main heat-generating faces of the second electronic components contacting the first engaging portion at lateral sides of the grooves.

14. The computer system of claim 9, wherein the motherboard further comprises a plurality of capacitors, and the first engaging portion of the base of the heat dissipation structure defines a plurality of recesses receiving the capacitors therein.

15. The computer system of claim 14, wherein the capacitors are not in contact with the first engaging portion in the recesses.

16. A heat dissipation device comprising:

a base comprising a bottom face and a top face, the bottom face comprising a first engaging portion configured for contacting a first electronic component and a second engaging portion configured for contacting a second electronic component, the first contacting portion being substantially perpendicular to the second contacting portion; and a plurality of fins extending from the top face of the base.

* * * * *